March 30, 1937.   B. G. CARLSON   2,075,502
LIQUID LEVEL HORIZON
Original Filed Dec. 18, 1931
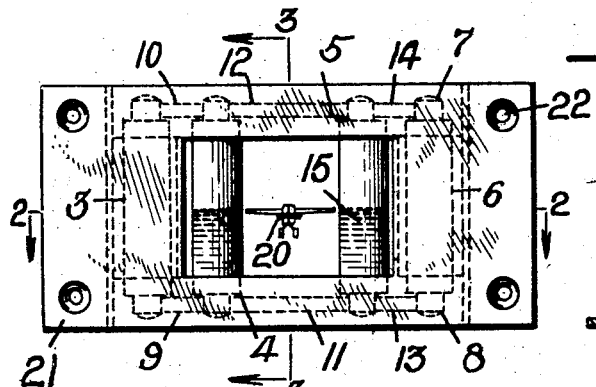
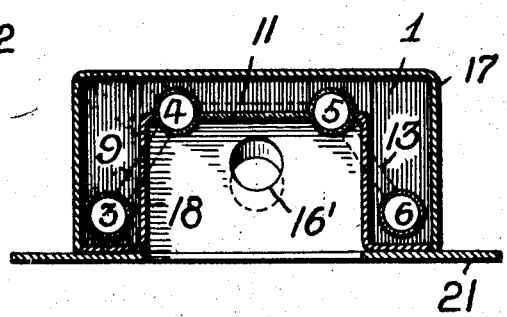
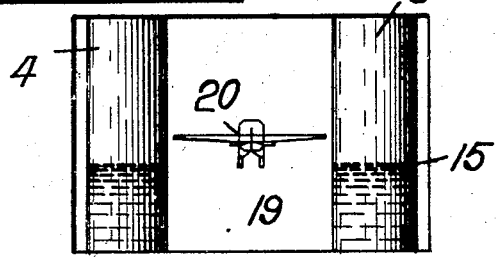
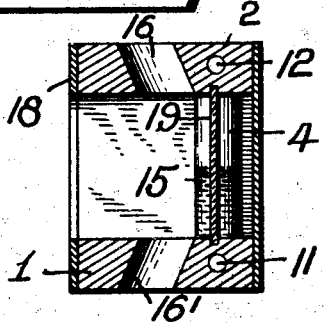
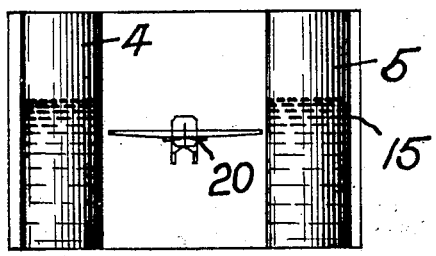
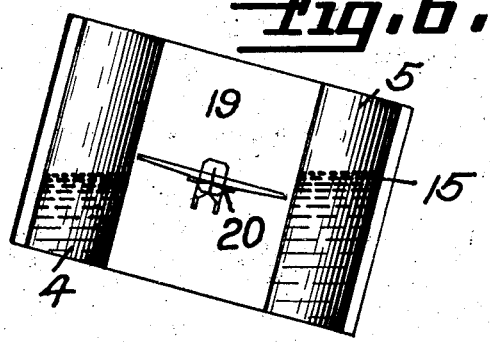
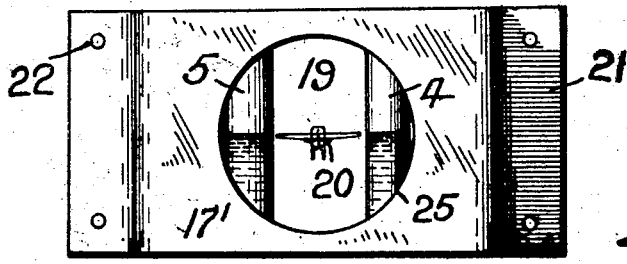
INVENTOR
Bert G. Carlson.
BY
Herbert H. Thompson
his ATTORNEY.

UNITED STATES PATENT OFFICE 2,075,502

LIQUID LEVEL HORIZON

Bert G. Carlson, Queens Village, N. Y., assignor to Sperry Gyroscope Company, Inc., New York, N. Y., a corporation of New York Application December 18, 1931, Serial No. 581,919
Renewed May 10, 1934

9 Claims. (Cl. 33—209)

This invention relates to artificial horizons for aircraft, that is, to a level indicator or an indicator of the horizontal or vertical in which the indications appear to move in a similar manner to the apparent movements of the real horizon upon either tilting or pitching of the craft. Such an indicator possesses a marked advantage over other level indicators because it does not have to be interpreted by the aviator, but the aviator may fly in the same manner by the artificial as he does by the real horizon.

According to the present invention the level device is of the liquid level variety. A plurality of liquid containers are employed spaced both longitudinally and laterally on the craft and interconnected preferably by restricted passages so that the relative level in the containers varies not only for lateral tilting of the craft but also for pitching, or in other words, for climbing and diving. In order to simplify the device I prefer to conceal some of the containers so that only one pair is visible on the dial of the instruments. The visible pair is preferably the rearward pair but the instrument is arranged so that they are visible from the front of the instrument. A suitable normally horizontal index line, which may be made to resemble an airplane, is utilized as a reference index on which to read the liquid level.

Referring to the drawing showing several forms my invention may assume;

Fig. 1 is a front elevation of my artificial horizon as it appears during level uniform straight flight.

Fig. 2 is a horizontal section taken on line 2—2 of Fig. 1.

Fig. 3 is a vertical section taken on line 3—3 of Fig. 1.

Fig. 4 is a front view of the face or dial only of the instrument as it would appear during an upward pitch or climb of the aircraft showing how the liquid level or artificial horizon line is moved downwardly.

Fig. 5 is a corresponding view showing how the device would appear during a downward pitch or dive of the craft.

Fig. 6 is a similar view showing the appearance of the face when the right hand wing is low.

Fig. 7 is a face view of a modified form of the instrument which is read from the opposite side from the form shown in Fig. 1.

As shown, my device comprises a base portion 1 and a top portion 2 between which a plurality of liquid containers 3, 4, 5, and 6 are clamped. Said base and top may be made of an easily worked material, such as wood, suitably impregnated to be non-absorbent, the base and top having holes bored therein into which the tubular containers fit. Said containers are preferably in the form of short glass tubes having reduced ends 7—8. Said ends have holes bored therein to connect with interconnecting passages through the base and top to connect said containers. As shown the tube 3 is connected to tube 4 by passages 9 and 10 at top and bottom, tube 4 is connected to tube 5 by passages 11 and 12, and tube 5 is connected to tube 6 by passages 13 and 14. Tubes or limbs 4 and 5, it should be observed, lie in the same transverse vertical plane, which is longitudinally spaced from the vertical plane of tubes 3 and 6. A colored liquid 15, such as alcohol or preferably refined oil of appreciable viscosity, partially fills each tube when the device is level. The liquid will, of course, flow from one tube to the other through the lower passageways to seek its level when the device is tilted, the upper passage-ways being provided to prevent air from being trapped in the tubes. Upper and lower holes 16 and 16' may be provided through the top and bottom so that the face or dial of the instrument may be illuminated by lamps placed above and below the same, (not shown).

The device is housed by a backing 17 secured to the upper and lower blocks. The front plate 18, however, is preferably made with a deep recess and is cut out in the middle so that the middle or rearward pair of tubes 4 and 5 are visible from the front of the instrument. A face or dial plate 19 may be placed between the tubes and on said plate is preferably painted or engraved a horizontal index 20 which, as shown, is preferably in the form of a miniature airplane.

The entire device may be secured to the instrument board of an airplane as by the front plate 21 having set screw holes 22 therein for the purpose. By this arrangement it will readily be seen that the device will appear as in Fig. 1 when the aircraft is flying level on a straight course. In case of an upward pitch or climb of the airplane, the tubes 4 and 5 would become higher than the tubes 3 and 6 and, therefore, liquid would flow out of the former into the latter. The level of the liquid in the tubes 4 and 5 would, therefore, drop and the device would appear as in Fig. 4. In other words, the artificial horizon line would move downwardly just as the real horizon would apparently move downwardly as the plane pitches upwardly. On the other hand, in case the plane pitches downwardly the liquid level in tubes 4 and 5 would rise and the instrument would appear as shown in Fig. 5. In case of tilting of the airplane so as to lower the right wing, for instance, the connected tubes 4 and 5 would act as a U tube and the indicator would appear as in Fig. 6, the artificial horizon line of the liquid remaining level and the plane wings tilting. For a tilt in the opposite direction the reverse would obviously occur. My device would also act as a correct banking indicator since the liquid will remain level when the airplane is turning if it is banked correctly but will show inclination if incorrectly banked.

In the above described form of the invention, as stated, a downward pitch of the airplane is indicated by an upward movement of the liquid so that to bring the airplane back to level again the aviator must raise the nose of his machine. Some aviators prefer an indicator in which the fact that the nose of the machine must be raised is indicated by a lowering of the liquid level. Such an instrument is shown in Fig. 7. According to this device, instead of reading the instrument from the side on which tubes 3 and 6 are, the instrument is read from the other side. For this purpose there is cut in the back plate 17' a hole 25 and the instrument is placed in the reverse position on the instrument board, the plate 17' then projecting through an aperture in the instrument board toward the aviator. In this case, it will be seen, a downward pitch of the plane will cause the level in the tubes 4 and 5 to rise, while climb will cause it to fall. This form of instrument has several advantages over the form shown in Fig. 1. In this form a lowering of a given portion of the machine is always shown by rising of the level in the visible liquid whether the lowering be a tilt or pitch. Accordingly the aviator need only remember that he must raise the lowered portion of the machine when the liquid level rises. It also possesses the advantage that its indications are not nullified by the acceleration of the craft which usually accompanies diving. Diving of the machine causes rise in the level of the liquid in bottles 4 and 5 and the same effect is caused by rapid acceleration so that one effect does not counteract the other.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an artificial horizon for aircraft, a plurality of liquid containers, spaced laterally and longitudinally of the craft, and means providing restricted passageways connecting said containers both laterally and longitudinally, means for concealing one pair of laterally spaced containers, both containers of said other pair lying to one and the same side of said first mentioned pair, whereby both pitch and lateral inclination are shown on one face as a unitary indication by the liquid level in the visible pair of containers.

2. In an artificial horizon for aircraft, a pair of longitudinally spaced liquid containers, a second pair of longitudinally spaced containers, laterally spaced from said first pair, means providing restricted passages connecting the several containers, means for concealing the forward container only of each pair as the horizon is viewed from the front, and means bearing an index representing the aircraft against which index the level of said liquid is read.

3. In an artificial horizon for aircraft, a pair of longitudinally spaced liquid containers, a second pair of longitudinally spaced containers, laterally spaced from said first pair, means providing restricted passages connecting the several containers, means for concealing one container only of each pair as the horizon is viewed from the front, and the visible ones being on the same side of the invisible ones and means bearing an index representing the aircraft against which the level of said liquid is read.

4. In an artificial horizon for aircraft, a pair of longitudinally spaced liquid containers, a second pair of longitudinally spaced containers, laterally spaced from said first pair, means providing restricted passages connecting the several containers, means for concealing the rearward container only of each pair as the horizon is viewed from the front, and means bearing an index representing the aircraft against which the level of said liquid is read.

5. In an artificial horizon for aircraft adapted to be secured to the back of the instrument board and to be visible from the front thereof, a pair of laterally spaced liquid containers, means providing a restricted passage connecting said containers, a second pair of containers positioned in front of the first pair nearer said instrument board and laterally spaced apart a greater distance than are the first pair, said passage providing means also having restricted passages connecting the latter pair with the former pair, means for concealing the latter pair from view, and means having a single index on which the liquid level in the former pair is read for inclination about both fore and aft and lateral axes.

6. In an artificial horizon for aircraft having a face, a pair of laterally spaced liquid containers, both of which are spaced from said face, means providing a restricted passage connecting said containers, a second pair of containers positioned in front of the first pair and laterally spaced apart a greater distance than are the first pair, said passage providing means also having restricted passages connecting the latter pair with the former pair, a mask for concealing the latter pair from view, said mask having a central aperture through which the former pair is visible, and means having a horizontal index extending between the containers of the visible pair for showing inclination about both fore and aft and lateral axes.

7. A liquid level bank and pitch indicator for aircraft comprising a pair of transparent observable liquid containers lying in a transverse vertical plane, a liquid container spaced longitudinally therefrom, means for concealing the same from view, and substantially invisible interconnections between both the upper and lower extremities of said containers.

8. A liquid level inclinometer for indicating inclination in two distinct axes, comprising a U-tube having spaced limbs and a third limb spaced from said U-tube and effective in a plane at an angle to that at which the U-tube operates and in confluent connection with the limbs of the U-tube, the first named limbs of said U-tube having a fixed mark alongside serving to indicate liquid levels in two distinct axes of inclination.

9. A liquid level inclinometer for indicating inclination in two distinct vertical planes, comprising a U-tube having laterally spaced limbs operative and visible in the face plane of the level and a third limb longitudinally spaced from said U-tube and effective in a vertical plane perpendicular to that at which the U-tube operates and in confluent connection with the limbs of the U-tube, there being a fixed mark alongside said visible limbs of the U-tube readable in connection with the liquid level in said visible limbs, the liquid level in one of the first mentioned limbs of the U-tube as compared with the liquid level in the other tube serving to indicate roll, and a common change in liquid level in both tubes serving to indicate pitch.

BERT G. CARLSON.